United States Patent
Furukawa et al.

(10) Patent No.: US 8,444,261 B2
(45) Date of Patent: May 21, 2013

(54) INKJET RECORDING LIQUID, INKJET RECORDING DEVICE USING INKJET RECORDING LIQUID, AND METHOD OF USING INKJET RECORDING LIQUID IN INKJET RECORDING DEVICE

(75) Inventors: Noriaki Furukawa, Osaka (JP); Susumu Hiroshima, Osaka (JP); Noriaki Ozawa, Osaka (JP)

(73) Assignee: Kyocera Mita Corporation (JP)

( * ) Notice: Subject to any disclaimer, the term of this patent is extended or adjusted under 35 U.S.C. 154(b) by 181 days.

(21) Appl. No.: 13/182,908

(22) Filed: Jul. 14, 2011

(65) Prior Publication Data
US 2012/0019595 A1  Jan. 26, 2012

(30) Foreign Application Priority Data
Jul. 26, 2010 (JP) .................................. 2010-167317

(51) Int. Cl.
*G01D 11/00* (2006.01)
(52) U.S. Cl.
USPC ............................ 347/100; 347/15; 106/31.13
(58) Field of Classification Search
USPC ................ 347/15, 42–43, 95–100; 106/31.13
See application file for complete search history.

(56) References Cited

U.S. PATENT DOCUMENTS

| | | | |
|---|---|---|---|
| 8,382,230 B2 * | 2/2013 | Furukawa | ........................ 347/17 |
| 2008/0152827 A1 * | 6/2008 | Hakamada et al. | ........... 427/466 |
| 2010/0086691 A1 | 4/2010 | Mukai et al. | |

FOREIGN PATENT DOCUMENTS

| | | |
|---|---|---|
| JP | 11-302586 | 11/1999 |
| JP | 2006-257122 | 9/2006 |
| JP | 2007-138093 | 6/2007 |
| JP | 2007-308712 | 11/2007 |
| JP | 2009-84501 | 4/2009 |

* cited by examiner

*Primary Examiner* — Thinh Nguyen
(74) *Attorney, Agent, or Firm* — Gerald E. Hespos; Michael J. Porco; Matthew T. Hespos (57) ABSTRACT

An inkjet recording liquid contains water, an organic solvent, a pigment, and a pigment dispersing resin. An weight-average molecular weight of the pigment dispersing resin exceeds 30000 and is 150000 or less. A mass ratio of the pigment dispersing resin to the pigment in the recording liquid (resin content/pigment content) is 0.1 or more and 1.0 or less. An acid value of the pigment dispersing resin is 160 or more and 240 or less. The inkjet recording liquid is discharged from a recording head of the inkjet recording device. Even when nozzles of the recording head become clogged due to drying or thickening of the inkjet recording liquid, the nozzle clogging can be easily resolved with a purge operation and wiping operation of the recording head by a wipe unit. Thus, it is possible to reduce an overconsumption of the recording liquid due to the foregoing purge operation.

6 Claims, 3 Drawing Sheets

INKJET RECORDING LIQUID, INKJET RECORDING DEVICE USING INKJET RECORDING LIQUID, AND METHOD OF USING INKJET RECORDING LIQUID IN INKJET RECORDING DEVICE

BACKGROUND OF THE INVENTION

1. Field of the Invention

The present disclosure relates to an inkjet recording liquid which can be used in an inkjet recording method of forming an image on a recording medium by discharging the inkjet recording liquid onto the recording medium, an inkjet recording device using the inkjet recording liquid, and a method of using the inkjet recording liquid in the inkjet recording device.

2. Description of the Related Art

Generally speaking, an inkjet recording liquid that is used in an inkjet recording method contains water, an organic solvent, a pigment, and a pigment dispersing resin. An inkjet recording device forms an image on a recording medium by discharging this kind of inkjet recording liquid from a recording head toward the recording medium that is being conveyed. This type of inkjet recording device usually includes a wipe unit equipped with a cap for covering a nozzle surface (a surface where nozzles are formed for discharging the recording liquid) of the recording head in order to prevent the drying of the recording liquid housed in the recording head.

Nevertheless, for example, when the power of the recording device is forcefully switched OFF from the outside rather than based on the OFF signal from the control unit, the nozzle surface of the recording head is left exposed without being covered with the cap of the wipe unit. Then, when the power of the recording device is subsequently turned ON, the nozzles could become clogged due to the drying or thickening of the recording liquid and disable the discharge of the recording liquid. Although the nozzle clogging could be resolved in certain cases by means of a purge operation (an operation of pushing out the recording liquid which may have thickened from the nozzles of the nozzle surface) or a wipe operation (an operation of wiping the nozzle surface) of the recording head by the wipe unit after turning ON the power of the recording device, a large quantity of the recording liquid may be consumed.

SUMMARY OF THE INVENTION

An object of the present disclosure is to provide an inkjet recording liquid, an inkjet recording device using the inkjet recording liquid, and a method of using the inkjet recording liquid in the inkjet recording device wherewith, even when the nozzles of the recording head become clogged due to the drying or thickening of the inkjet recording liquid, the nozzle clogging can be easily resolved.

One aspect of the present disclosure is an inkjet recording liquid containing water, an organic solvent, a pigment, and a pigment dispersing resin, wherein an weight-average molecular weight of the pigment dispersing resin exceeds 30000 and is 150000 or less, a mass ratio of the pigment dispersing resin to the pigment in the recording liquid (resin content/pigment content) is 0.1 or more and 1.0 or less, and an acid value of the pigment dispersing resin is 160 or more and 240 or less.

Another aspect of the present disclosure is an inkjet recording device including a recording head for discharging an inkjet recording liquid onto a recording medium, wherein the inkjet recording liquid which contains water, an organic solvent, a pigment, and a pigment dispersing resin, and in which an weight-average molecular weight of the pigment dispersing resin exceeds 30000 and is 150000 or less, a mass ratio of the pigment dispersing resin to the pigment in the recording liquid (resin content/pigment content) is 0.1 or more and 1.0 or less, and an acid value of the pigment dispersing resin is 160 or more and 240 or less is discharged from the recording head.

Yet another aspect of the present disclosure is a method of using an inkjet recording liquid in an inkjet recording device, wherein the inkjet recording liquid which contains water, an organic solvent, a pigment, and a pigment dispersing resin, and in which an weight-average molecular weight of the pigment dispersing resin exceeds 30000 and is 150000 or less, a mass ratio of the pigment dispersing resin to the pigment in the recording liquid (resin content/pigment content) is 0.1 or more and 1.0 or less, and an acid value of the pigment dispersing resin is 160 or more and 240 or less is housed in a recording head of the inkjet recording device, and the inkjet recording liquid is used during a period in which a following rate of change of viscosity of the inkjet recording liquid is 150% or less. The rate of change of viscosity (%) is a value that is represented by (viscosity of the inkjet recording liquid after exposing the inkjet recording liquid in an environment of 23° C. and 50% RH/initial viscosity of the inkjet recording liquid)×100.

The object, features and advantages of the present disclosure will become more apparent based on the ensuing detailed description and the appended drawings.

DETAILED DESCRIPTION OF THE PREFERRED EMBODIMENTS

As a result of intense study regarding an inkjet recording liquid in which the nozzle clogging can be easily resolved (which has superior nozzle recoverability) even when the nozzles of the recording head become clogged due to the drying or thickening of the inkjet recording liquid, the present inventors discovered that the recording liquid needs to have superior re-solubility and the rate of change of viscosity of the recording liquid needs to be relatively small, and thereby completed this invention.

Here, the re-solubility of the recording liquid is represented by a value (%) obtained by dividing the pigment concentration of the supernatant solution resulting from exposing the recording liquid until it becomes paste form, adding the new and same recording liquid thereto, and additionally adding water of the vaporized amount, by the pigment concentration of the original recording liquid. The closer it is to 100%, the more superior the re-solubility. The pigment concentration can be measured, for example, by using a UV absorption measuring instrument ("UVM-402" manufactured by Shimadzu Corporation or the like).

Moreover, the rate of change of viscosity of the recording liquid is represented by a value (%) obtained by dividing the viscosity of the exposed recording liquid by the initial viscosity of the recording liquid. The closer it is to 100%, the smaller the rate of change of viscosity. The viscosity of the recording liquid can be measured, for example, by using a vibratory viscometer ("SV-10" manufactured by A&D Company, Limited or the like).

The inkjet recording liquid according to this embodiment is a recording liquid containing water, an organic solvent, a pigment, and a pigment dispersing resin. The weight-average molecular weight of the pigment dispersing resin exceeds 30000 and is 150000 or less. The mass ratio of the pigment dispersing resin to the pigment in the recording liquid (resin content/pigment content) is 0.1 or more and 1.0 or less. The acid value of the pigment dispersing resin is 160 or more and 240 or less.

As a result of the weight-average molecular weight of the pigment dispersing resin exceeding 30000, the storage stability of the recording liquid can be further improved, and, by being 150000 or less, the rate of change of viscosity of the recording liquid can be further reduced.

As a result of the mass ratio of the pigment dispersing resin to the pigment in the recording liquid (resin content/pigment content) being 0.1 or more, the re-solubility of the recording liquid can be further improved, and, by being 1.0 or less, the rate of change of viscosity of the recording liquid can be further reduced.

As a result of the acid value of the pigment dispersing resin being 160 or more, the re-solubility of the recording liquid can be further improved, and, by being 240 or less, the rate of change of viscosity of the recording liquid can be further reduced.

With the inkjet recording liquid according to this embodiment, preferably, the ratio of the organic solvent to the total amount of the water and the organic solvent exceeds 0 mass % and is less than 40 mass %. This is because the dispersion stability of the pigment can be further improved. When the foregoing ratio becomes 40 mass % or more, the storage stability of the recording liquid tends to deteriorate.

With the inkjet recording liquid according to this embodiment, preferably, the pigment content is 2 to 8 mass %. As a result of the foregoing content being 2 mass % or more, the image density can be further stabilized. Moreover, as a result of the foregoing content being 8 mass % or less, the rate of change of viscosity of the recording liquid can be further reduced.

[Inkjet Recording Device]

Figure 1:
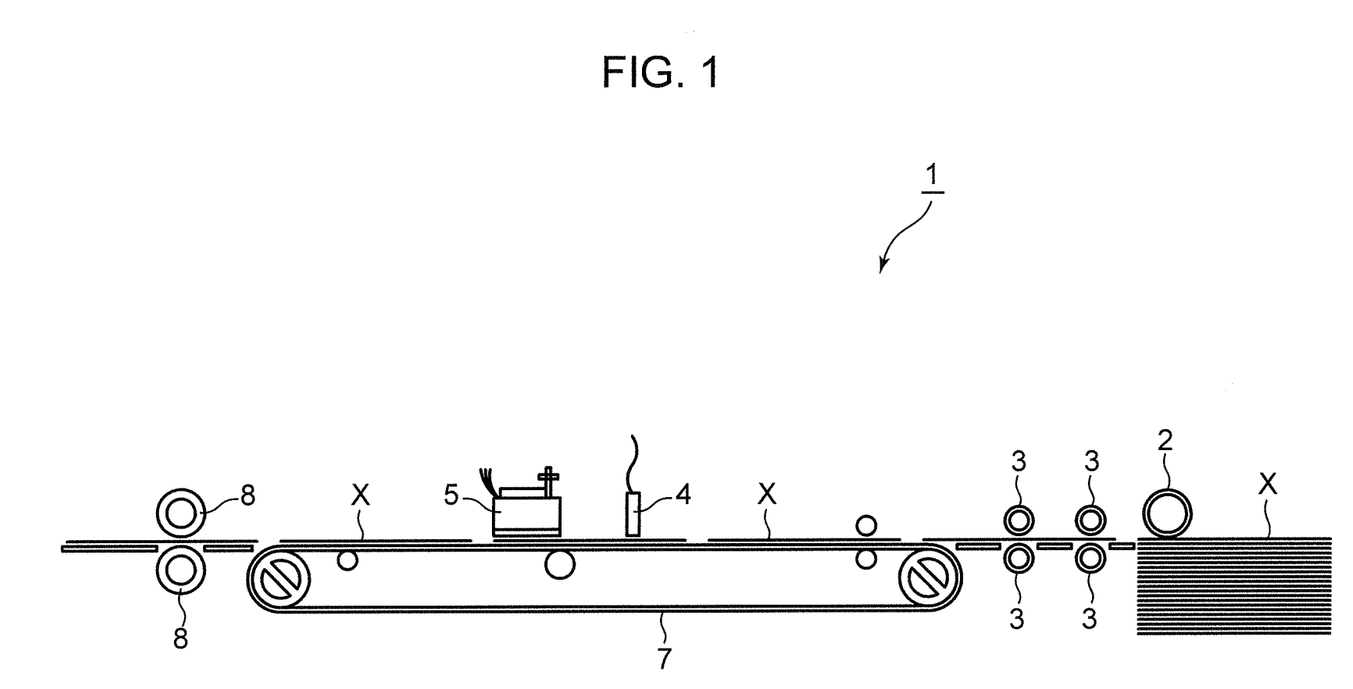
FIG. 1 is a schematic configuration diagram of an inkjet recording device according to an embodiment of the present disclosure.

As shown in FIG. 1, the inkjet recording device 1 of this embodiment is an inkjet printer for forming an image on a recording medium X by using an inkjet recording liquid based on the image information that was sent from another device.

The inkjet recording device 1 includes a paper housing part for housing a recording medium X such as PPC paper in a stacked state in a paper feed cassette not shown. The recording medium X is fed one sheet at a time from the uppermost sheet with the rotation of a paper feed roller 2, and supplied to a paper conveying part by conveying roller pairs 3 . . . 3.

The paper conveying part includes an endless conveyor belt 7 wrapped horizontally between a pair of rollers. The recording medium X that is supplied by the conveying roller pairs 3 . . . 3 is conveyed to a position that is opposite to an image forming part with the movement of the conveyor belt 7.

The image forming part includes, above the conveyor belt 7, an elongated line-type recording head 5 having a length that is equal to or greater than the width of the recording medium X that is conveyed with the conveyor belt 7. The recording head 5 extends in a direction that is orthogonal to the conveying direction of the recording medium X and is fixed to a case (not shown) of the inkjet recording device 1. The recording head 5 houses the recording liquid and is aligned with a plurality of nozzles of a dot forming part on the lower surface facing the conveyor belt 7 or the recording medium X as described later. The recording head 5 is able to form an image on the recording medium X at high speed by simultaneously and concurrently discharging the recording liquid across the total width of the recording medium X. Accordingly, the inkjet recording device 1 is an inkjet recording device equipped with a line-type recording head which enables high speed and high image quality, and is capable of sufficiently achieving high-speed processing. The recording head 5 is disposed without coming into contact with the recording medium X and fixed to the foregoing case so that the distance between the lower surface (nozzle surface) of the recording head and the recording medium X on the conveyor belt 7 becomes approximately 1 mm.

A detection sensor 4 for detecting the tip of the recording medium X that is conveyed by the conveyor belt 7 is provided above the conveyor belt 7 on the upstream side of the recording head 5 in the conveying direction of the recording medium X, and on the downstream side of the conveying roller pair 3 in the conveying direction of the recording medium X. A recording liquid discharge command is output to the recording head 5 based on the time that the sensor 4 detects the tip of the recording medium X.

The recording medium X to which an image was formed as a result of the recording liquid being adhered thereto by the recording head 5 while it is being conveyed with the conveyor belt 7 is continuously conveyed with the conveyor belt 7, transferred to the pair of upper and lower discharge rollers 8 at the terminal part of the conveyor belt 7, and thereby discharged from the conveyor belt 7.

Figure 2:
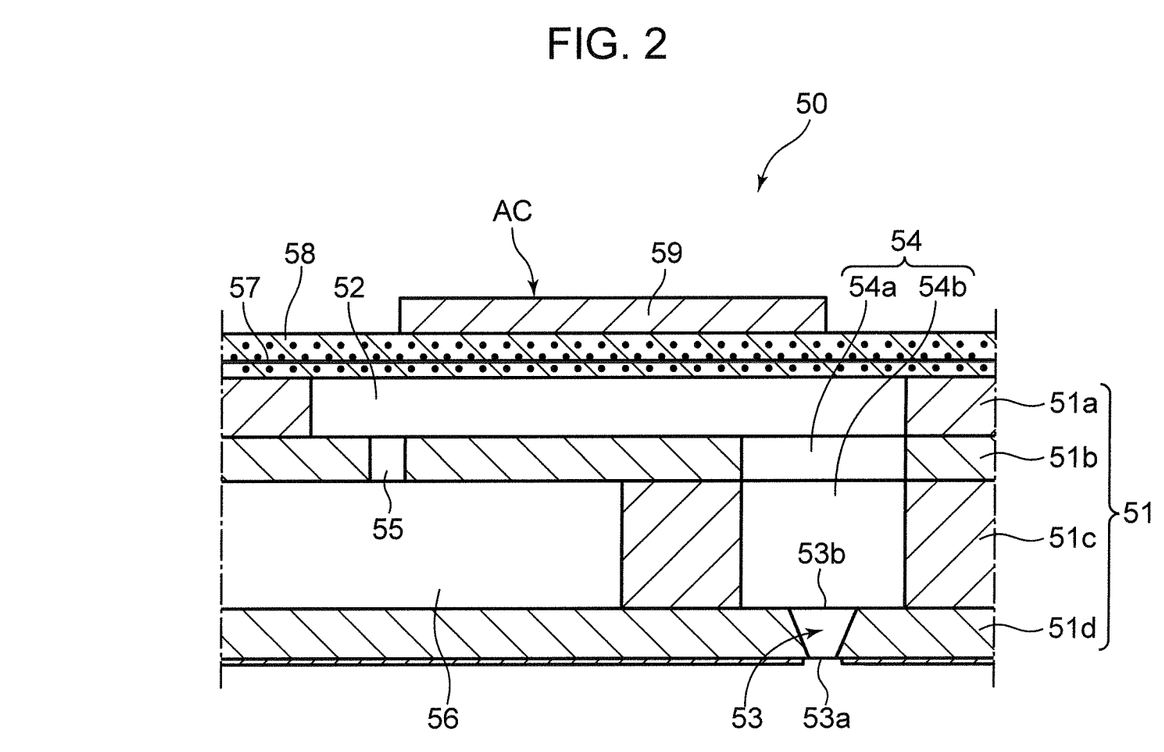
FIG. 2 is an enlarged longitudinal cross section of a dot forming part provided to a recording head of the inkjet recording device.

FIG. 2 is a longitudinal cross section showing an enlargement of one of the plurality of dot forming parts 50 that are aligned in the recording head 5 of the inkjet recording device 1.

The recording head 5 is an elongated line-type recording head extending in a direction that is orthogonal to the conveying direction of the recording medium X. Although not specifically shown, the recording head 5 is structured such that three sub heads (dividing heads) are sequentially linked in a direction that is orthogonal to the conveying direction of the recording medium X. The respective sub heads are structured such that four trapezoidal (from a planar view) nozzle clustered areas are sequentially disposed in a direction that is orthogonal to the conveying direction of the recording medium X (so that the upper base and lower base of the trapezoid alternately face opposite directions) at the lower surface (nozzle surface) thereof. In the respective nozzle clustered areas, the dot forming parts 50 and the nozzles 53 shown in FIG. 2 are arranged in four rows in the conveying direction of the recording medium X. By setting pitches between the adjacent nozzles 53 in the same row to 150 dpi, and shifting the positions of the nozzles 53 between the adjacent rows ¼ of the pitches in the direction that is orthogonal to the conveying direction of the recording medium X, the formation of a 600 dpi image is realized. Since the number of dot forming parts 50 and nozzles 53 per row in the nozzle clustered area is set to be 166, 644 dot forming parts 50 and nozzles 53 are aligned in entirety of a single nozzle clustered area (four rows). Accordingly, 7968 (664×4×3) dot forming parts 50 and nozzles 53 are provided to the overall recording head 5.

The dot forming part 50 includes an oval (from a planar view) compression chamber 52, and one end of the compression chamber 52 is in communication with the nozzle 53 formed at the lower surface of the recording head 5 via a nozzle flow passage 54, and the other end is in communication with a recording liquid common supply route 56 via a choked passage 55. The nozzle 53 has an inverted frustroconical shape where the diameter of the upper opening 53b is greater than the diameter of the lower opening 53a when viewed as a longitudinal cross section.

The dot forming part 50 is configured based on the lamination of a first substrate 51a formed with a compression chamber 52, a second substrate 51b formed with an upper part 54a of the nozzle flow passage 54 and the choked passage 55, a third substrate 51c formed with a lower part 54b of the nozzle flow passage 54 and the recording liquid common supply route 56, and a fourth substrate 51d formed with the nozzle 53. The substrate 51 of the recording head 5 is provided based on the laminated first to fourth substrates 51a to 51d.

The upper face of the substrate 51 includes a piezoelectric actuator AC configured by laminating a laminar piezoelectric element 58 which internally includes a common electrode 57, and an individual electrode 59 corresponding to the compression chamber 52 of the respective dot forming parts 50. A pressure wave is transferred to the recording liquid in the compression chamber 52 as a result of the piezoelectric actuator AC being driven, the recording liquid in the nozzle flow passage 54 and the nozzle 53 is oscillated due to the pressure wave, and the recording liquid is discharged from the lower opening 53a of the nozzle 53 toward the recording medium X.

Here, an example of the specific numerical values that are preferred for the specification of the dot forming part 50 is shown below.

Area of the compression chamber 52: 0.2 mm$^2$
Width of the compression chamber 52: 200 μm
Depth of the compression chamber 52: 100 μm
Length of the nozzle 53: 30 μm
Radius of the lower opening 53a of the nozzle 53: 10 μm
Diameter of the nozzle flow passage 54: 200 μm
Length of the nozzle flow passage 54: 800 μm
Diameter of the choked passage 55: 30 μm
Length of the choked passage 55: 40 μm The inkjet recording device 1 illustrated in FIG. 1 had a single recording head 5 and formed an image with a plain color. Nevertheless, without limitation to this kind of configuration, for example, a plurality of (four) separate recording heads 5 for each Y (yellow) ink, M (magenta) ink, C (cyan) ink and K (black) ink may be arranged in the conveying direction of the recording medium X to form a full color image.

Moreover, the inkjet recording device 1 may include a serial-type recording head, in which the recording head scans the recording medium X, in substitute for the line-type recording head in order to realize the intended high-speed processing.

Moreover, although not shown, a wipe unit is provided in the vicinity of the conveyor belt 7. The wipe unit is equipped with a cap for covering the nozzle surface of the recording head 5 for preventing the drying of the recording liquid housed in the recording head 5, and a wipe blade for wiping the nozzle surface of the recording head 5. When the power of the recording device 1 is turned OFF, if the recording head 5 is not being used, foremost, the conveyor belt 7 is lowered from the recording position shown in FIG. 1 to a withdrawal position. Next, the wipe unit moves horizontally from a standby position to a position that is immediately below the recording head 5. Subsequently, the wipe unit rises and the cap covers the nozzle surface of the recording head 5. When the power of the recording device 1 is turned ON, the wipe unit performs the purge operation of pushing out the recording liquid which may have thickened from the nozzles of the nozzle surface of the recording head 5, and the wipe operation of wiping the nozzle surface of the recording head 5 with the wipe blade.

[Inkjet Recording Method]

As a result of using the inkjet recording device 1 configured as described above and housing, in the recording head 5, the inkjet recording liquid according to this embodiment described later, it is possible to implement the inkjet recording method of this embodiment of conveying the recording medium X by the conveyor belt 7, discharging the recording liquid from the recording head 5 onto the recording medium X that is being conveyed so as to cause the recording liquid to adhere onto the recording medium X, and thereby forming an image.

[Inkjet Recording Liquid]

The inkjet recording liquid according to this embodiment contains water, an organic solvent, a pigment, and a pigment dispersing resin. The main features have been described above and will not be repeated here.

As the pigment that can be used in this embodiment, used may be, for example, organic pigments such as insoluble azo pigment, soluble azo pigment, phthalocyanine blue, isoindolinone, quinacridone, dioxazine violet, berinone, and betarine, inorganic pigments such as carbon black and titanium dioxide, and body pigments such as white clay, talc, clay, diatom earth, calcium carbonate, barium sulfate, titanium oxide, alumina white, silica, kaolin, and aluminum hydroxide.

As the yellow (Y) pigment, for example, used may be C.I. pigment yellow 1 (fast yellow G), 3, 12 (disazo yellow AAA), 13, 14, 17, 23, 24, 34, 35, 37, 42 (iron oxide yellow), 53, 55, 74, 81, 83 (disazo yellow HR), 95, 97, 98, 100, 101, 104, 108, 109, 110, 117, 120, 128, 138, 150, 153, or the like. When using the above, depending on the situation, one type may be used independently or a combination of two or more types may be used.

As the magenta (M) pigment, for example, used may be C.I. pigment red 1, 2, 3, 5, 17, 22 (brilliant fast scarlet), 23, 31, 38, 48:2 (permanent red 2B (Ba)), 48:2 (permanent red 2B (Ca)), 48:3 (permanent red 2B (Sr)), 48:4 (permanent red 2B (Mn)), 49:1, 52:2, 53:1, 57:1 (brilliant carmine 6B), 60:1, 63:1, 63:2, 64:1, 81 (rhodamine 6G lake), 83, 88, 92, 101 (rouge), 104, 105, 106, 108 (cadmium red), 112, 114, 122 (dimethyl quinacridone), 123, 146, 149, 166, 168, 170, 172, 177, 178, 179, 185, 190, 193, 209, 219, or the like. When using the above, depending on the situation, one type may be used independently or a combination of two or more types may be used.

As the cyan (C) pigment, for example, used may be C.I. pigment blue 1, 2, 15 (copper phthalocyanine blue R), 15:1, 15:2, 15:3 (phthalocyanine blue G), 15:4, 15:6 (phthalocyanine blue E), 16, 17:1, 56, 60, 63, or the like. When using the above, depending on the situation, one type may be used independently or a combination of two or more types may be used.

As the black (K) pigment, for example, used may be carbon blacks (C.I. pigment black 7) such as furnace black, lamp black, acetylene black, and channel black; organic pigments such as aniline black (C.I. pigment black 1); and copper oxide and iron oxide (C.I. pigment black 11), metals such as titanium oxide. When using the above, depending on the situation, one type may be used independently or a combination of two or more types may be used.

The average grain size of the pigments that can be used in this embodiment is 30 to 300 nm, preferably 50 to 150 nm, and more preferably around 100 nm. The average particle size of the pigments can be measured by using, for example, a dynamic light scattering-type particle size distribution analyzer ("LB-550" manufactured by Horiba, Ltd.), a particle size distribution analyzer ("Zetasizer Nano" manufactured by Sysmex Corporation) or the like.

As the pigment dispersing resin that can be used in this embodiment, for example, used may be water-soluble resins such as styrene-(meta)acrylic acid copolymer, styrene-(meta)acrylic acid-alkyl (meta)acrylate ester copolymer, styrene-maleic acid copolymer, styrene-maleic acid-alkyl (meta)acrylate ester copolymer, styrene-maleic acid half ester copolymer, vinylnaphthalene-(meta)acrylic acid copolymer, and vinylnaphthalene-maleic acid copolymer. When using these polymer dispersants, one type may be used independently or a combination of two or more types may be used. Among the above, in particular styrene-(meta)acrylic acid-alkyl (meta)acrylate ester copolymer is preferably used. Moreover, copolymers of a macromonomer and (meta)acrylic acid, styrene monomer or alkyl (meta)acrylate ester can also be preferably used.

Generally speaking, the content of these pigment dispersing resins in the recording liquid is preferably 0.1 to 10 mass %, more preferably 0.2 to 8 mass %, and most preferably 1.0 to 6 mass %.

As the organic solvents that can be used in this embodiment, for example, used may be a wetting agent, penetration enhancer, a pH adjuster, a leveling agent, an antifoamer, a viscosity modifier, an antiseptic or the like.

As the wetting agent or the penetration enhancer, for example, used may be ethylene glycol monobutyl ether, triethylene glycol monomethyl ether, triethylene glycol monobutyl ether, diethylene glycol monomethyl ether, ethylene glycol monomethyl ether, triethylene glycol, hexylene glycol, octanediol, thiodiglycol, 2-butyl-2-ethyl-1, 3-propanediol, 3-methyl-1, 5-pentanediol, 2-ethyl-2-methyl-1, 3-propanediol, 2-butyl-2-ethyl-1, 3-butanediol, 2,4-pentanediol, 1,5-pentanediol, 2,2-dimethyl-1, 3-propanediol trimethylolpropane, 2-methyl-1, 3-propanediol, diethylene glycol, propylene glycol, 1,3-butanediol, ethylene glycol, polyethylene glycol, glycerin, 2-pyrrolidone, or the like. When using these water-soluble organic solvents, one type may be used independently or a combination of two or more types may be used.

As the pH adjuster, for example, used may be organic acid such as acetic acid or succinic acid and the salts thereof; base of triethanolamine or the like. Among the above, one type may be used independently or a combination of two or more types may be used as needed.

As the leveling agent, for example, used may be nonionic surfactants such as polyoxyethylene alkylethers, polyoxyethylene alkylarylethers, acetylenic glycols, and polyoxyethylene-polyoxypropylene block copolymers. Among the above, one type may be used independently or a combination of two or more types may be used as needed.

As the antifoamer, for example, used may be silicon emulsions, polyether modified silicon emulsions, polyolefin-polyether modified emulsions or the like. Among the above, one type may be used independently or a combination of two or more types may be used as needed.

Generally speaking, the content of these organic solvents in the recording liquid is 0 to 30 mass %, preferably 0.1 to 20 mass %, and more preferably 1.0 to 10 mass %.

The inkjet recording liquid according to this embodiment can be prepared by sufficiently agitating, mixing and dispersing the foregoing raw materials by using, for example, a wet-type media disperser or a propeller-type stirrer (otherwise, a ball mill, sand mill, roll mill, agitator, supersonic homogenizer, wet-type jet mill, paint shaker or the like may also be used), and subsequently subject the raw materials to centrifugation and filtration.

As the wet-type media disperser, for example, even when using zirconia beads having a media diameter of 0.2 to 1.0 mm, preferably used is a wet-type disperser including a mechanism capable of applying optimal dispersive energy to the respective media. For example, preferably used may be "Nano Grain Mill" manufactured by Asada Iron Works Co., Ltd, "MSC Mill" manufactured by Mitsui Kozan Co., Ltd, "Dyno Mill" manufactured by Shinmaru Enterprises Corporation, and so on. Subsequently, the liquid that was subject to dispersion treatment is subject to centrifugation to eliminate coarse particles such as foreign matter and dirt and subject to filtration to eliminate micro particles in order to ultimately obtain the inkjet recording liquid of this embodiment.

Note that, in order to prepare the recording liquid, a high concentration pigment dispersion (liquid having a pigment concentration that is several times greater than the pigment concentration in the recording liquid) may be prepared in advance.

An embodiment of the present disclosure has been described in detail above, but the foregoing explanation is merely an exemplification in all aspects, and this disclosure is not limited thereto. It should be understood that countless modified examples not shown can be anticipated without deviating from the scope of the present disclosure.

EXAMPLES

The present disclosure is now explained in further detail based on the Examples of this disclosure, but this disclosure is not limited to the following Examples.

[Preparation of Inkjet Recording Liquid]

Foremost, a pigment dispersion for use in preparing the inkjet recording liquid was prepared according to the following composition.

75.50 to 82.25 mass % of ion exchange water 0.5 mass % of organic solvent ("Olfin (registered trademark) E1010" manufactured by Nissin Chemical Industry; Leveling agent; 2,4,7,9-tetramethyl-5-desine-4, 7-diol di[polyoxyethylene]ether)

15 mass % of pigment (phthalocyanine blue)

2.25 to 9.00 mass % of pigment dispersing resin (neutralized by NaOH aqueous solution)

A mass of water in the NaOH aqueous solution used for the neutralization of the pigment dispersing resin, and a mass of water yielded by the neutralization reaction are included in a mass of the ion exchange water. A mass of Na in the NaOH aqueous solution used for the neutralization of the pigment dispersing resin is included in a mass of the pigment dispersing resin.

Particularly, the ion exchange water, the organic solvent, the pigment, the pigment dispersing resin and the NaOH aqueous solution of necessary quantity for the neutralization of the pigment dispersing resin were added in "Nano Grain Mill" manufactured by Asada Iron Works Co., Ltd, and the pigment and the pigment dispersing resin were agitated, mixed and dispersed under a water-cooling condition, using zirconia beads having a media diameter of 0.5 mm, so as to prepare a pigment dispersion in which a mean volume diameter of the pigment is in a range of 70 to 130 nm.

The pigment dispersing resin used was prepared as follows. Specifically, a macromonomer ("AS-6" manufactured by Toagosei Co., Ltd.; oligomer in which a (meta)acryloyl group was bound with one molecular end of polystyrene; number average molecular weight of 6000), methacrylic acid, styrene monomer, and methyl methacrylate were subject to polymerization reaction according to various mixing ratios in methyl ethyl ketone (MEK) with 2,2'-azobisisobutyronitrile as the initiator, and, after the polymerization was completed, the solvent was subject to vacuum distillation. The weight-average molecular weight (Mw) of the obtain resin was measured using GPC (Gel Permeation Chromatography). Moreover, the acid value of the obtained resin was measured using a potentiometric automatic titrator. Various types of pigment dispersing resins with various weight-average molecular weights (Mw) and various acid values were thereby obtained.

Subsequently, the inkjet recording liquid was prepared according to the following composition.

26.6 mass % of pigment dispersion
0.5 mass % of "Olfin (registered trademark) E1010"
5.0 mass % of 1,3-butanediol
5.0 mass % of triethylene glycol monobutyl ether
5.0 mass % of 2-pyrrolidone
15.0 to 30.0 mass % of glycerin
27.9 to 42.9 mass % of ion exchange water 1,3-butanediol, triethylene glycol monobutyl ether, 2-pyrrolidone and glycerin are a wetting agent or a penetration enhancer (organic solvent).

Upon preparing the recording liquid, the ratio of all organic solvents to the total amount of the ion exchange water and all organic solvents (Olfin (registered trademark) E1010, 1,3-butanediol, triethylene glycol monobutyl ether, 2-pyrrolidone and glycerin) in the recording liquid was adjusted to be less than 40 mass %. In the foregoing case, the viscosity of the recording liquid was also adjusted to fall within the range of 6.0±0.2 (mPa·s).

Figure 3:
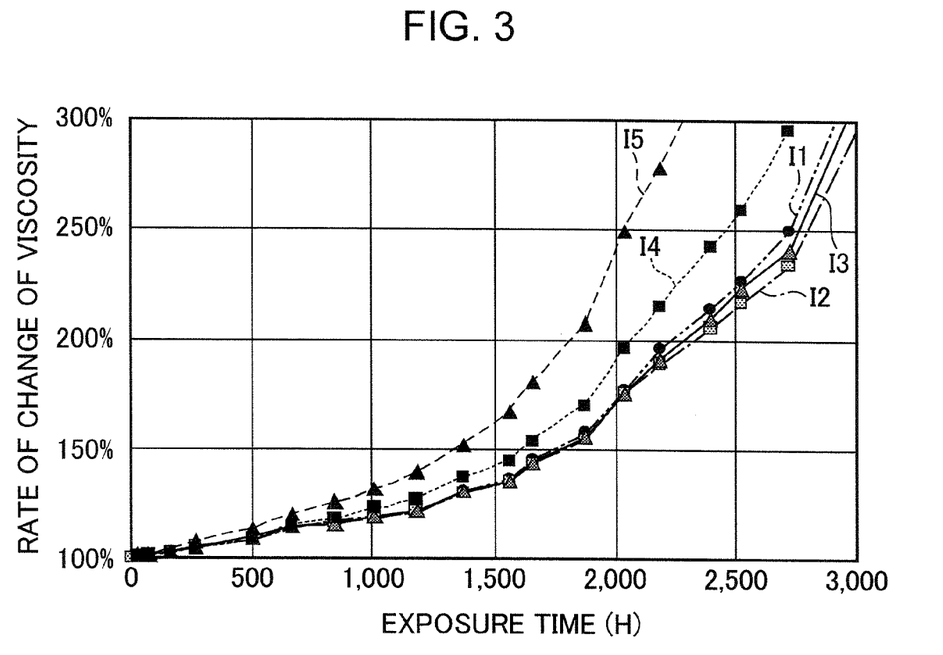
FIG. 3 is a graph showing a relationship between the exposure time and the rate of change of viscosity of recording liquids I1 to I5 according to the Examples.
Figure 4:
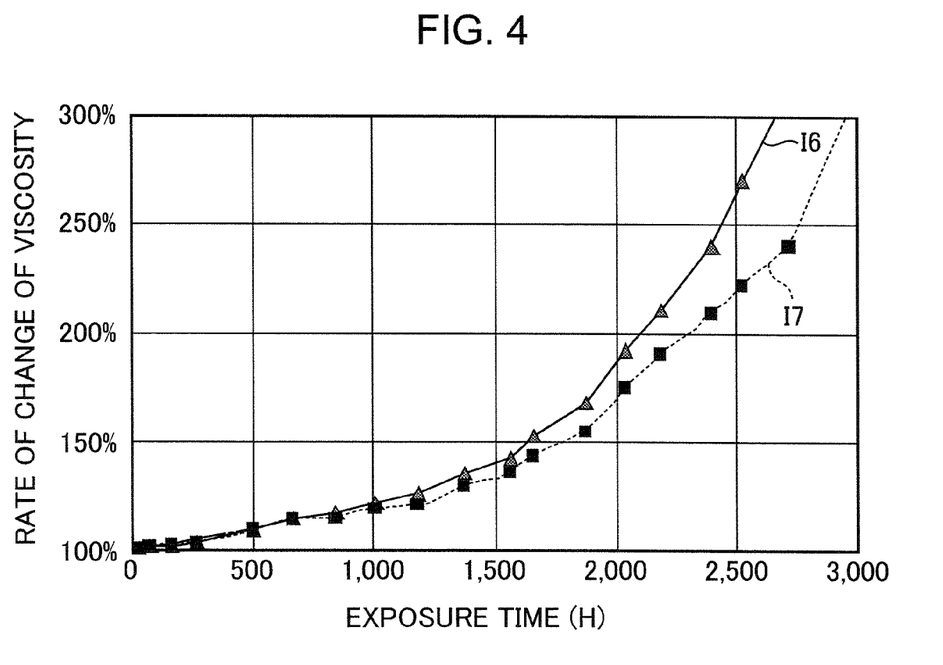
FIG. 4 is a graph showing a relationship between the exposure time and the rate of change of viscosity of recording liquids I6 and I7 according to the Examples.

Based on the above, as shown in Table 1 to Table 7, FIG. 3 and FIG. 4, obtained were various types of recording liquids (I1 to I26) with various weight-average molecular weights (Mw) of the pigment dispersing resin, various acid values of the pigment dispersing resin, various mass ratios of the pigment dispersing resin to the pigment in the recording liquid (resin content/pigment content), various ratios of the organic solvent to the total amount of the water and the organic solvent, and various contents of the pigment in the recording liquid.

[Evaluation of Inkjet Recording Liquid]
(Re-Solubility)

10 g of the prepared inkjet recording liquid was placed in a glass container with a diameter of 47 mm, and exposed in a constant temperature bath of 60° C. for 2 weeks. The recording liquid became a paste form as a result of its water vaporizing. The container was removed from the constant temperature bath and returned to room temperature. 5 g of the new and same recording liquid was added to the container and exposed for 1 hour. In addition, after adding water in an amount that was vaporized, the supernatant solution was extracted. The supernatant solution was diluted 3000 times with water, and the UV absorption was measured using an UV absorption measuring instrument ("UVM-402" manufactured by Shimadzu Corporation). The pigment concentration of the supernatant solution was obtained based on the UV absorption, and the re-solubility of the recording liquid was evaluated based on a value (%) obtained by dividing the foregoing value by the pigment concentration of the original recording liquid. The closer it is to 100%, the more superior the re-solubility. The results are shown in Table 1 and Table 3 to Table 7.

(Rate of Change of Viscosity)

200 g of the prepared inkjet recording liquid was placed in a glass container with a diameter of 47 mm and exposed in an environment of 23° C./50% RH, sampled for each lapse of a given period of time, and the viscosity of the sampled liquid was measured by using a vibratory viscometer ("SV-10" manufactured by A&D Company, Limited). The value (%) obtained by dividing the measured viscosity by the initial viscosity was used as the rate of change of viscosity. The closer it is to 100%, the smaller the rate of change of viscosity. The results are shown in Table 2 to Table 7, FIG. 3 and FIG. 4. Note that the rate of change of viscosity described in Table 3 to Table 7 is the value when the exposure time was 1500 hours.

(Nozzle Recoverability: Ease of Resolving Nozzle Clogging)

The inkjet recording device 1 shown in FIG. 1 was used, and the prepared inkjet recording liquid was housed in the recording head 5. After performing three sets of the purge operation (amount per purge was 2 ml of the recording liquid) and the wipe operation of the recording head 5 by the wipe unit, the nozzle surface of the recording head 5 was exposed at room temperature without being covered by the cap. After the lapse of a given period of time, three sets of the purge operation (amount per purge was 2 ml) and the wipe operation of the recording head 5 by the wipe unit were performed, and a check pattern for confirming the discharge/non-discharge of the recording liquid of all nozzles was printed. The results of such print were visually confirmed and evaluated based on the following criteria. Note that, when there was a non-discharging nozzle in the first printing, the second purge/wipe (three times as a set) was performed, and the check pattern was printed. The results are shown in Table 2 to Table 7.

○: The discharge of all nozzles was confirmed with the print after the first purge/wipe.

Δ: There was a non-discharging nozzle with the print after the first purge/wipe, but the discharge of all nozzles was confirmed with the print after the second purge/wipe.

x: There was a non-discharging nozzle with the print even after the second purge/wipe.

[Observation of Evaluation Results]
(Re-Solubility)

The recording liquids in which the mass ratio of the pigment dispersing resin (Mw exceeds 30000 and is 150000 or less) to the pigment in the recording liquid (resin content/pigment content) was 0.1 or more and the acid value of the pigment dispersing resin (Mw exceeds 30000 and is 150000 or less) was 160 or more had favorable re-solubility (for example, 100%) (recording liquids I2 to I5, I6, I7, I9 to I12, I14 to I17, I18 to I20, I22 to I26).

The recording liquid in which the mass ratio of the pigment dispersing resin (Mw exceeds 30000 and is 150000 or less) to the pigment in the recording liquid (resin content/pigment content) was less than 0.1, even though the acid value of the pigment dispersing resin (Mw exceeds 30000 and is 150000 or less) was 160 or more, had inferior re-solubility (for example, less than 100%) (recording liquid I13).

The recording liquid in which the acid value of the pigment dispersing resin (Mw exceeds 30000 and is 150000 or less) was less than 160, even though the mass ratio of the pigment dispersing resin (Mw exceeds 30000 and is 150000 or less) to the pigment in the recording liquid (resin content/pigment content) was 0.1 or more, had inferior re-solubility (for example, less than 100%) (recording liquids I1, I8).

(Rate of Change of Viscosity)

With the recording liquids in which the mass ratio of the pigment dispersing resin (Mw exceeds 30000 and is 150000 or less) to the pigment in the recording liquid (resin content/pigment content) was 1.0 or less and the acid value of the pigment dispersing resin (Mw exceeds 30000 and is 150000 or less) was 240 or less, the rate of change of viscosity was relatively small (150% or less at an exposure time of 1500 hours) (recording liquids I4, I6, I7, I8 to I11, I13 to I15, I18 to I20, I22 to I25).

With the recording liquids in which the mass ratio of the pigment dispersing resin (Mw exceeds 30000 and is 150000 or less) to the pigment in the recording liquid (resin content/pigment content) exceeded 1.0, even though the acid value of the pigment dispersing resin (Mw exceeds 30000 and is 150000 or less) was 240 or less, the rate of change of viscosity was relatively great (in excess of 150% at an exposure time of 1500 hours) (recording liquids I16, I17).

With the recording liquids in which the acid value of the pigment dispersing resin (Mw exceeds 30000 and is 150000 or less) exceeded 240, even though the mass ratio of the pigment dispersing resin (Mw exceeds 30000 and is 150000 or less) to the pigment in the recording liquid (resin content/pigment content) was 1.0 or less, the rate of change of viscosity was relatively great (in excess of 150% at an exposure time of 1500 hours) (recording liquids I5, I12).

With the recording liquid in which the weight-average molecular weight (Mw) of the pigment dispersing resin exceeded 150000, the rate of change of viscosity was relatively great (in excess of 150% at an exposure time of 1500 hours) (recording liquid I21).

With the recording liquids in which the pigment content was 8 mass % or less, the rate of change of viscosity was relatively small (150% or less at an exposure time of 1500 hours) (recording liquids I22 to I25).

With the recording liquid in which the pigment content exceeded 8 mass %, the rate of change of viscosity was relatively great (in excess of 150% at an exposure time of 1500 hours) (recording liquid I26).

(Nozzle Recoverability)

With the recording liquids with favorable re-solubility (for example, 100%) and in which the rate of change of viscosity was 150% or less, the evaluation of the nozzle recoverability was "○" (refer to Table 2, recording liquids I6, I7, I9 to I11, I14, I15, I18 to I20, I22 to I25).

Even though the rate of change of viscosity was 150% or less, with the recording liquids in which the re-solubility was inferior (for example, less than 100%), the evaluation of the nozzle recoverability was "x" (recording liquids I8, I13).

Even though the re-solubility was favorable (for example, 100%), with the recording liquids in which the rate of change of viscosity exceeded 150%, the evaluation of the nozzle recoverability was "Δ" or "x" (refer to Table 2, recording liquids I12, I16, I17, I21, I26).

FIG. 3 is a graph showing a relationship between the exposure time and the rate of change of viscosity of the recording liquids I1 to I5 according to the Examples. The recording liquid I1 included the pigment dispersing resin (Mw: 38000, acid value: 130), the recording liquid I2 included the pigment dispersing resin (Mw: 45000, acid value: 160), the recording liquid I3 included the pigment dispersing resin (Mw: 55000, acid value: 200), the recording liquid I4 included the pigment dispersing resin (Mw: 53000, acid value: 240), and the recording liquid I5 included the pigment dispersing resin (Mw: 48000, acid value: 300).

As evident from FIG. 3, the recording liquid I5 in which the acid value of the pigment dispersing resin is 300 was the only one in which the rate of change of viscosity in the exposure time of 1500 hours (approximately 2 months) exceeded 150%, and, even though the re-solubility is favorable (for example, 100%), the nozzle recoverability becomes inferior when a state where the recording liquid I5 is not capped continued for approximately 2 months, and a large quantity of the recording liquid is consumed with the purge/wipe operation of the wipe unit. Meanwhile, with the recording liquids I1 to I4 in which the acid value of the pigment dispersing resin is 240 or less, the rate of change of viscosity in the exposure time of 1500 hours (approximately 2 months) was 150% or less, and, on the condition that the re-solubility is favorable (for example, 100%), the nozzle recoverability is favorable even when a state where the recording liquids I1 to I4 are not capped continued for approximately 2 months, and the overconsumption of the recording liquid with the purge/wipe operation of the wipe unit can be prevented.

FIG. 4 is a graph showing a relationship between the exposure time and the rate of change of viscosity of the recording liquids I6 and I7 according to the Examples. The recording liquid I6 included the pigment dispersing resin (Mw: 35000, acid value: 200, and the (resin content/pigment content) ratio=0.35), and the recording liquid I7 included the pigment dispersing resin (Mw: 50000, acid value: 200, and the (resin content/pigment content) ratio=0.35).

As evident from FIG. 4, with the recording liquids I6 and I7 in which the acid value of the pigment dispersing resin is 200 and the (resin content/pigment content) ratio is 0.35, the rate of change of viscosity in the exposure time of 1500 hours (approximately 2 months) was 150% or less, and the re-solubility was favorable (for example, 100%). Thus, the nozzle recoverability was favorable even when a state where the recording liquids I6 and I7 are not capped continued for approximately 2 months, and the overconsumption of the recording liquid with the purge/wipe operation of the wipe unit can be prevented.

TABLE 1

| | RECORDING LIQUID | | | | |
|---|---|---|---|---|---|
| | I1 | I2 | I3 | I4 | I5 |
| WEIGHT-AVERAGE MOLECULAR WEIGHT OF RESIN | 38000 | 45000 | 55000 | 53000 | 48000 |
| ACID VALUE OF RESIN | 130 | 160 | 200 | 240 | 300 |
| RESIN CONTENT/ PIGMENT CONTENT | 0.25 | 0.25 | 0.25 | 0.25 | 0.25 |
| RE-SOLUBILITY (%) | 30 | 100 | 100 | 100 | 100 |

TABLE 2

| | RECORDING LIQUID I4 | | | | | |
|---|---|---|---|---|---|---|
| EXPOSURE TIME (H) | 500 | 670 | 1176 | 1368 | 1560 | 1656 |
| RATE OF CHANGE OF VISCOSITY (%) | 108 | 114 | 117 | 136 | 143 | 154 |
| NOZZLE RECOVERABILITY | ○ | ○ | ○ | ○ | ○ | Δ |

| | RECORDING LIQUID I5 | | | | | |
|---|---|---|---|---|---|---|
| EXPOSURE TIME (H) | 500 | 670 | 1000 | 1176 | 1368 | 1560 |
| RATE OF CHANGE OF VISCOSITY (%) | 113 | 120 | 131 | 140 | 151 | 167 |
| NOZZLE RECOVERABILITY | ○ | ○ | ○ | ○ | Δ | X |

TABLE 3

| | RECORDING LIQUID | |
|---|---|---|
| | I6 | I7 |
| WEIGHT-AVERAGE MOLECULAR WEIGHT OF RESIN | 35000 | 50000 |
| ACID VALUE OF RESIN | 200 | 200 |
| RESIN CONTENT/ PIGMENT CONTENT | 0.35 | 0.35 |
| RE-SOLUBILITY (%) | 100 | 100 |
| RATE OF CHANGE OF VISCOSITY (%) | 142 | 135 |
| NOZZLE RECOVERABILITY | ○ | ○ |

TABLE 4

| | RECORDING LIQUID | | | | |
|---|---|---|---|---|---|
| | I8 | I9 | I10 | I11 | I12 |
| WEIGHT-AVERAGE MOLECULAR WEIGHT OF RESIN | 53000 | 53000 | 53000 | 53000 | 53000 |
| ACID VALUE OF RESIN | 150 | 160 | 200 | 240 | 250 |
| RESIN CONTENT/ PIGMENT CONTENT | 0.50 | 0.50 | 0.50 | 0.50 | 0.50 |
| RE-SOLUBILITY (%) | 60 | 100 | 100 | 100 | 100 |
| RATE OF CHANGE OF VISCOSITY (%) | 135 | 138 | 140 | 143 | 157 |
| NOZZLE RECOVERABILITY | X | ○ | ○ | ○ | Δ |

TABLE 5

| | RECORDING LIQUID | | | | |
|---|---|---|---|---|---|
| | I13 | I14 | I15 | I16 | I17 |
| WEIGHT-AVERAGE MOLECULAR WEIGHT OF RESIN | 53000 | 53000 | 53000 | 53000 | 53000 |
| ACID VALUE OF RESIN | 240 | 240 | 240 | 240 | 240 |
| RESIN CONTENT/ PIGMENT CONTENT | 0.08 | 0.1 | 1.0 | 1.1 | 1.4 |
| RE-SOLUBILITY (%) | 60 | 100 | 100 | 100 | 100 |
| RATE OF CHANGE OF VISCOSITY (%) | 133 | 136 | 146 | 154 | 167 |
| NOZZLE RECOVERABILITY | X | ○ | ○ | Δ | X |

TABLE 6

| | RECORDING LIQUID | | | |
|---|---|---|---|---|
| | I18 | I19 | I20 | I21 |
| WEIGHT-AVERAGE MOLECULAR WEIGHT OF RESIN | 40000 | 80000 | 140000 | 160000 |
| ACID VALUE OF RESIN | 240 | 240 | 240 | 240 |
| RESIN CONTENT/ PIGMENT CONTENT | 0.50 | 0.50 | 0.50 | 0.50 |
| RE-SOLUBILITY (%) | 100 | 100 | 100 | 100 |
| RATE OF CHANGE OF VISCOSITY (%) | 142 | 144 | 148 | 163 |
| NOZZLE RECOVERABILITY | ○ | ○ | ○ | X |

TABLE 7

|  | RECORDING LIQUID | | | | |
| --- | --- | --- | --- | --- | --- |
|  | I22 | I23 | I24 | I25 | I26 |
| PIGMENT CONTENT (MASS %) | 2 | 4 | 6 | 8 | 9 |
| WEIGHT-AVERAGE MOLECULAR WEIGHT OF RESIN | 55000 | 55000 | 55000 | 55000 | 55000 |
| ACID VALUE OF RESIN | 200 | 200 | 200 | 200 | 200 |
| RESIN CONTENT/ PIGMENT CONTENT | 0.50 | 0.50 | 0.50 | 0.50 | 0.50 |
| RE-SOLUBILITY (%) | 100 | 100 | 100 | 100 | 100 |
| RATE OF CHANGE OF VISCOSITY (%) | 135 | 140 | 143 | 148 | 157 |
| NOZZLE RECOVERABILITY | ○ | ○ | ○ | ○ | Δ |

Moreover, as a result of preparing an inkjet recording liquid in which a ratio of the organic solvent to a total amount of the water and the organic solvent is 40 mass % or more, the coarsening of pigment particles associated with the lapse of time was observed. In other words, the dispersion stability of the pigment and the storage stability of the recording liquid had deteriorated.

According to the present disclosure, even when the nozzles of the recording head become clogged due to the drying or thickening of the recording liquid, since the recording liquid has superior re-solubility and the rate of change of viscosity of the recording liquid is relatively small, the nozzle clogging can be easily resolved by the purge operation and wipe operation of the recording head by the wipe unit. Thus, the problem of the overconsumption of the recording liquid due to the foregoing purge operation can be inhibited.

This application is based on Japanese Patent application serial No. 2010-167317 filed in Japan Patent Office on Jul. 26, 2010, the content of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An inkjet recording liquid containing water, an organic solvent, a pigment, and a pigment dispersing resin,
    wherein an weight-average molecular weight of the pigment dispersing resin exceeds 30000 and is 150000 or less,
    a mass ratio of the pigment dispersing resin to the pigment in the recording liquid (resin content/pigment content) is 0.1 or more and 1.0 or less, and
    an acid value of the pigment dispersing resin is 160 or more and 240 or less.

2. The inkjet recording liquid according to claim 1, wherein a ratio of the organic solvent to a total amount of the water and the organic solvent exceeds 0 mass % and is less than 40 mass %.

3. The inkjet recording liquid according to claim 1, wherein a pigment content is 2 to 8 mass %.

4. An inkjet recording device including a recording head for discharging an inkjet recording liquid onto a recording medium,
    wherein the inkjet recording liquid according to claim 1 is discharged from the recording head.

5. The inkjet recording device according to claim 4, wherein the recording head is a line-type recording head which extends in a direction that is orthogonal to a conveying direction of the recording medium.

6. A method of using an inkjet recording liquid in an inkjet recording device,
    wherein the inkjet recording liquid according to claim 1 is housed in a recording head of the inkjet recording device, and the inkjet recording liquid is used during a period in which a following rate of change of viscosity of the inkjet recording liquid is 150% or less;
    the rate of change of viscosity (%) is a value that is represented by (viscosity of the inkjet recording liquid after exposing the inkjet recording liquid in an environment of 23° C. and 50% RH/initial viscosity of the inkjet recording liquid)×100.

* * * * *